Oct. 6, 1959   J. C. BRANNAN   2,907,936
SERVO CONTROL SYSTEM
Filed May 15, 1957
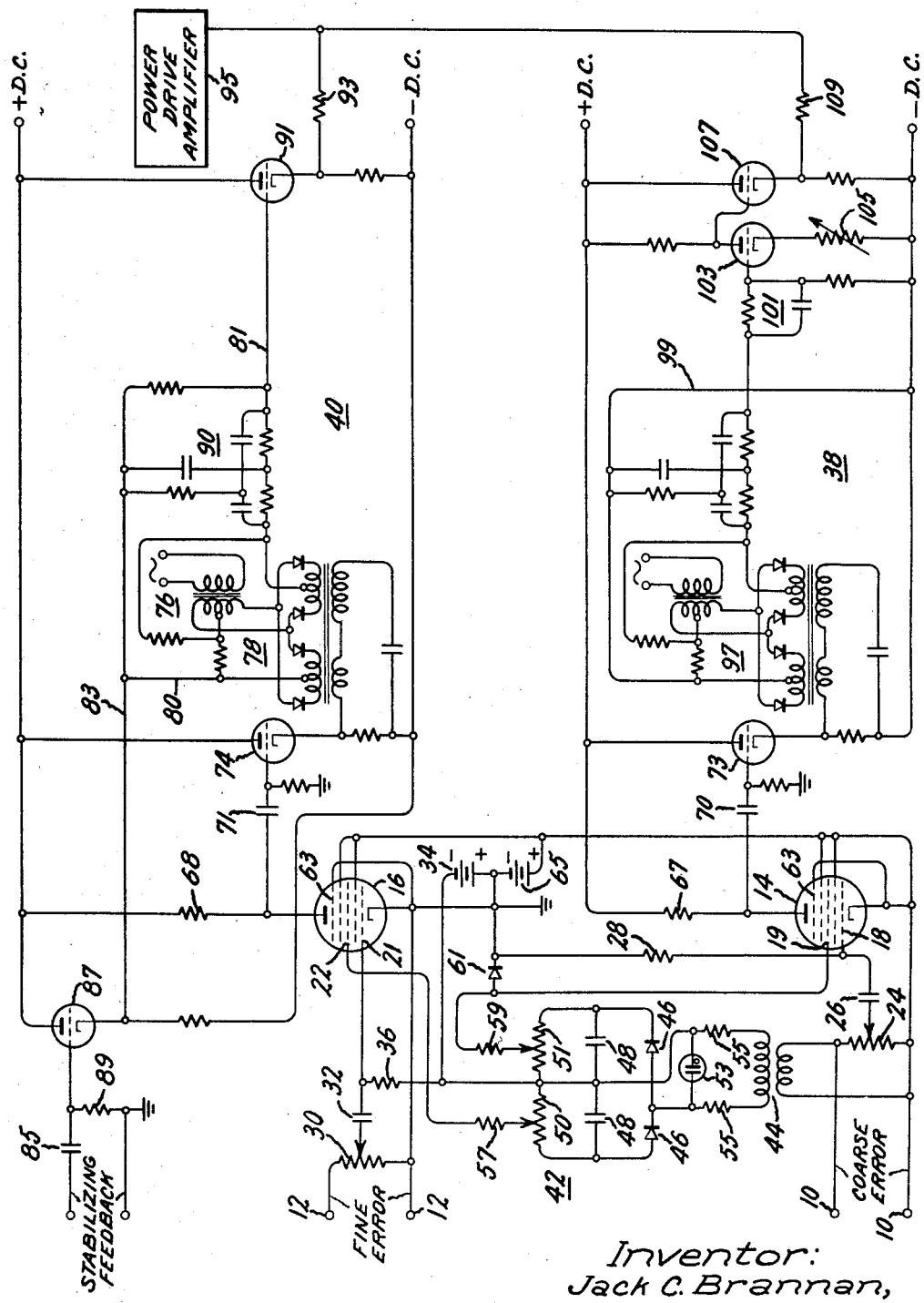
Inventor:
Jack C. Brannan,
by Carl Baker
His Attorney.

United States Patent Office 2,907,936
Patented Oct. 6, 1959

2,907,936

SERVO CONTROL SYSTEM

Jack C. Brannan, Schenectady, N.Y., assignor to General Electric Company, a corporation of New York Application May 15, 1957, Serial No. 659,422

7 Claims. (Cl. 318—28)

This invention relates generally to servo systems of both open and closed loop type, and more particularly relates to servo systems incorporating power drive means for positioning a load in response to a plurality of control signals each corresponding to servo errors of a different order of magnitude.

Systems of this kind commonly utilize two or more selsyns (synchros) as error signal generators for producing the several control signals supplied the system power drive. Typically, a low speed selsyn system coupled to be driven directly at load speed exercises "coarse" control over the power drive means when the error in load speed or position exceeds a predetermined value, and a high speed selsyn system driven at some multiple of load speed exercises "fine" highly accurate control when the error is less than this predetermined value. Transfer means responsive to a predetermined magnitude of the "coarse" error signal voltage are provided for transferring control of the power drive from one to the other of these "fine" and "coarse" control channels dependent on whether the error is greater or less than the predetermined value.

As heretofore constructed the transfer systems for effecting this necessary transfer of control between the coarse and fine control channels have usually been of electromechanical type incorporating voltage relays for switching between the two channels at a predetermined magnitude of coarse error voltage. While these systems have proven generally satisfactory, they are subject to a number of disadvantages among which is the difficulty of effecting smooth transfer between the two control channels. At the crossover point, the abrupt mechanical switching of the control often causes a "jump" which gives rise to high impact loads on gearing and other structure, and which may delay effective control by the system to which control is being transferred.

All-electronic transfer networks also are known and avoid some of the disadvantages of electromechanical systems just explained. These known electronic systems do not fully obviate roughness in transferring between the coarse and fine control channels, however, and they also present difficulties in harmonizing the coarse and fine error signals with each other and with other control signals in the system. The point at which transfer between the coarse and fine channels occurs in these systems also is difficult to control with desired precision.

The present invention has as its principal object the provision of new and improved servo apparatus not subject to the foregoing and other disadvantages of prior such systems utilizing both coarse and fine control signals conjointly. Another object of the invention is the provision, in servo systems utilizing both coarse and fine control channels, of electronic transfer means for automatically gradually transferring control of the system power drive from one channel to the other responsive to a predetermined magnitude of the coarse error signal with maximum precision and minimum roughness in operation during transfer.

Still another object is the provision, in servo systems utilizing coarse and fine error signals and one or more stabilizing feedback signals, of transfer means for controlling operation of the system power drive responsive to the combined coarse error and stabilizing feedback signals when the coarse error signal is less than a predetermined magnitude; responsive to combined coarse error, fine error and stabilizing feedback signals when the coarse error signal is at said predetermined magnitude; and responsive to the combined fine error and stabilizing feedback signals when the coarse error signal is greater than said predetermined magnitude.

It is also an object of the invention to provide a servo system of the type utilizing coarse and fine control channels with transfer means for transferring control of the system power drive from one channel to the other responsive to the coarse error signal, incorporating means for properly matching the error and feedback signals to prevent premature saturation of the coarse control channel.

In carrying out the invention in its preferred form in servo apparatus incorporating both coarse and fine error signal generating means, a transfer network is provided including coarse and fine control channels each having an electric valve therein with a first control input to which is applied the output of one of the error signal generators. Means responsive to magnitude of the coarse error signal are connected to apply a control signal to a second control input provided in each of the electric valves, with these control signals both being dependent on the magnitude of the coarse error signal and effective to gradually cut the coarse control channel on and the fine control channel off with increasing magnitude of the coarse error signal. The output of each control channel as passed or amplified by the electric valve therein is combined with that of the other channel and with stabilizing feedback signals if used, and the combined signal then controls operation of the system power drive. Means preferably are provided in the network for effecting proper matching of the servo error and stabilizing signals as combined for control of the system power drive.

The invention and its various objects, features and advantages will be further understood by reference to the appended claims and the following detailed description when read in conjunction with the accompanying drawing, the single figure of which is a circuit diagram of one preferred embodiment of the invention.

Referring to the drawing, the coarse and fine error signals are applied across terminals 10 and terminals 12, respectively, as shown. Normally each of these error signals will be produced by a pair of selsyns (not shown), one of which is mechanically connected for movement in synchronism with the controlled object and the other mechanically connected to a pilot device such as a hand-station or the like. The coarse channel selsyns usually are coupled to the load and pilot device so as to be driven directly at load speed; the fine channel selsyns are geared up so as to be driven at some multiple of load speed in well known manner.

The high speed and low speed selsyn systems each produce an error signal in the form of an alternating voltage the effective value of which varies sinusoidally with the magnitude of the measured error; varying from zero at zero error to a positive maximum at 90 degrees rotation of the selsyn, back to zero at 180 degrees error, to a negative maximum at 270 degrees, and to zero again at 360 degrees. The phase of this error signal voltage reverses at zero and 180 degrees.

As will be explained, the control system is so designed that the direction in which the power drive is actuated depends on the phase of the error signal voltage and the power drive speed is dependent on the error signal voltage magnitude. Whether the coarse or fine error signal is the controlling voltage at any given moment is determined by the transfer network through which both signals are connected to control the power drive as hereinafter explained.

As shown this transfer network includes a pair of electric valves 14 and 16 which in the illustrated embodiment take the form of pentagrid vacuum tubes of suitable type such, for example, as the 6L7 pentagrid. The tube 14 includes a pair of control inputs in the form of control grids 18 and 19, and tube 16 includes a like pair of control grids 21 and 22. The coarse error signal applied across terminals 10 is connected to control grid 18 of tube 14 through a gain controlling potentiometer 24 and coupling capacitor 26, grid bias being supplied by a resistor 28 connected to ground as shown.

The fine error signal is similarly connected to the control grid 21 of the tube 16 through a gain controlling potentiometer 30 and coupling capacitor 32, grid bias for this tube being supplied by a D.-C. voltage source 34 connected to the grid through a resistor 36 as shown. This negative D.-C. voltage source is included in the grid bias circuit for tube 16, whereas none is provided in the grid bias circuit for tube 14, by reason of the difference in voltage levels of the transfer signals supplied the two tubes as hereinafter explained.

The coarse and fine error tubes 14 and 16 are connected into and form part of coarse and fine control channels designated generally by reference numerals 38 and 40, respectively. For transferring control between these coarse and fine control channels there is provided a control circuit, designated generally by reference numeral 42, which is responsive to coarse error signal magnitude and supplies to the control grid 19 of coarse channel tube 14 a transfer control signal effective to gradually cut on that tube with increasing coarse error signal magnitude, and also supplies to the control grid 22 of fine channel tube 16 a transfer signal effective to gradually cut off that tube with increasing coarse error signal magnitude.

As shown, this control circuit includes a transformer 44 having its primary connected across the coarse error signal input terminals 10, and its secondary connected into a full-wave rectifier network including diode or equivalent rectifier elements 46, filter capacitors 48 and a pair of potentiometers 50 and 51. Preferably a gas tube 53 is connected across the secondary of transformer 44 for purposes of voltage limiting in cooperation with resistors 55. The rectifier network may be referenced to the same negative voltage as control grid 21 of tube 16 by connection to the D.-C. voltage source 34 as shown, so that all points on both potentiometers 50 and 51 are held at negative polarity with respect to ground and the transfer control signals applied to the grids of the two tubes never become positive with respect to the tube cathodes.

The potentiometer 50 has its pickoff connected through a resistor 57 to control grid 22 of the fine channel tube 16, and potentiometer 51 has its pickoff connected through resistor 59 to the corresponding control grid 19 of coarse tube 14. This latter connection preferably includes a rectifier element 61 shunting any positive voltage in the output signal from the potentiometer 51 to ground, to further assure that the signal as applied to grid 19 never becomes positive. Preferably the shield grids 63 of both tubes 14 and 16 are connected to the tube cathodes, and the two remaining control grids of both tubes are supplied with a fixed bias voltage by connection to the positive terminal of a D.-C. voltage source 65. The cathode of the fine channel tube 16 may as shown be connected directly to ground, while the cathode of the coarse tube 14 is connected to the positive D.-C. bias voltage source 65 as shown, this being done because of the previously described difference in bias levels of the control signals supplied the tube control grids 19 and 22.

The two tubes 14 and 16 have their plates connected to a "B" voltage source through plate load resistors 67 and 68, respectively, the tube output being taken between the load resistor and plate in conventional manner. The coarse and fine error signals as passed by tubes 14 and 16 are coupled through capacitors 70 and 71 to the grids of a pair of cathode followers 73 and 74, connected in the coarse and fine control channels 38 and 40 respectively.

In the fine control channel, the A.-C. error signal output of cathode follower 74 is coupled into a conventional discriminator circuit 76 including the usual transformer across the primary of which the A.-C. error signal is impressed. The center-tapped transformer secondaries apply their output voltages across a rectifier bridge biased by an A.-C. potential derived from a second transformer 78, the primary of which is excited by the main A.-C. power supply. The rectifier bridge output, as taken across leads 80 and 81, is a D.-C. signal voltage of polarity and magnitude dependent on the phase and magnitude of the A.-C. input signal.

Stabilizing feedback signals, such as generated by a tachometer generator, rate gyro or other feedback signal source driven with the load, may be connected into the error signal channels through a capacitor 85 and cathode follower 87, with the usual grid leak resistor 89 being connected between the cathode follower grid and ground. The output signal from cathode follower 87 as taken on lead 83 is directly added to the discriminated fine error signal, being directly connected to the discriminator output lead 80 and connected to lead 81 through the usual discriminator filter network designated generally by reference numeral 90.

The stabilizing feedback and fine error signals thus combined are impressed on the grid of a cathode follower 91 the output of which is connected through a resistor 93 to control operation of the power drive amplifier 95. This power drive amplifier may be of any conventional type capable of providing power output to the system prime mover in a manner to drive the prime mover in a direction and at a rate dependent on the polarity and magnitude of the input signal to the amplifier.

The coarse error channel is similar to the fine channel just described in that it includes a discriminator circuit 97 operative in substantially the same manner as that in the fine error channel. The discriminator output is referenced to a fixed negative voltage by lead 99, however, and the stabilizing signal is not directly added to the discriminator output as in the fine error channel. Direct addition of the stabilizing feedback and coarse error signals is not feasible because of the relatively great difference in gain of their respective signal channels, the coarse error signal channel normally having much smaller gain than the stabilizing feedback. Nor can the coarse error signal simply be A.-C. amplified to match the stabilizing feedback signal and then directly added thereto, since if this is done the discriminator transformer in the coarse error channel then saturates at too low levels of the coarse error signal.

A substantial range of permissible variation of the coarse error signal without coarse channel saturation is desirable in order to permit servo synchronization without appreciable overshoot and to prevent oscillation. Since in any system the maximum deceleration of which the servo is capable is necessarily limited, the servo must apply total deceleration at some point well ahead of correspondence to permit stopping at exact correspondence without overshoot and oscillation. To provide this necessary deceleration signal, an anticipation circuit normally is interposed in the coarse error channel and functions to reverse the phase of the signal at some point ahead of exact correspondence, the amount of anticipation thus afforded varying in accordance with servo speed. Anticipation circuits usually are in the form of lead filters and accordingly require a changing signal as an input; hence the coarse error channel which provides this input must not saturate anywhere in the range of coarse error signal magnitude within which a signal phase reversal may be necessary for purposes of decelerating the servo.

For example, if the maximum velocity of the servo is 50 deg./sec. angular rotation and the maximum deceleration is 100 deg./sec.$^2$, at least 12.5 degree is required for the system to decelerate from its maximum velocity and come to a complete stop. Therefore, for synchronization without overshoot, the system must apply total deceleration when 12.5 degrees ahead of correspondence, and in order to obtain this necessary deceleration signal the coarse error channel must not saturate sooner than 12.5 degrees before correspondence.

For these reasons the coarse error signal preferably is not A.-C. amplified and directly added to the stabilizing feedback signal in the systems of the invention. Rather, the coarse error signal is first discriminated and the discriminated signal then passed through a lead filter 101 which produces the coarse signal phase reversal necessary to provide a deceleration signal to the system power drive as just explained. The signal as modified by this lead filter then is D.-C. amplified by a triode 103, the gain of which is controlled by variable resistor 105. As is apparent, signal amplification in triode 103 has no effect on signal levels in the discriminator and therefore can not cause saturation therein.

The coarse error signal thus amplified is applied to the grid of an output stage cathode follower 107, passed through resistor 109 and directly combined with the fine error and stabilizing feedback signals, then being fully compatible therewith. Control of the power drive amplifier 95 then is responsive to all three signals as thus combined.

In operation of the system, small departures from exact correspondence will give rise to a fine error signal of significant magnitude, but will cause no appreciable coarse error signal. Since the coarse error signal is approximately zero, no voltage is induced in the secondary of transformer 44 in the control circuit 42, and this circuit therefore supplies to the grids of both tubes 14 and 16 a constant control voltage which is substantially equal to the voltage of D.-C. bias voltage source 34. This voltage is effective to substantially completely cut off the coarse error tube 14 and to cut on the fine error tube 16. The fine error signal therefore is passed by tube 16, discriminated in network 76 and combined with the stabilizing feedback signals if any, to energize the power drive amplifier and associated prime mover under exclusive control of the fine error signal channel.

For larger servo errors, the coarse error signal becomes of appreciable magnitude and energizes the control circuit 42 so as to cause a voltage drop across potentiometers 50 and 51. The pickoff on potentiometer 50 therefore becomes more negative with respect to the D.-C. voltage source, and that of potentiometer 51 becomes more positive. Accordingly, the bias voltage applied to the control grid 22 of tube 16 is more negative and that tube thus is gradually cut off, and the bias voltage applied to grid 19 of tube 14 becomes less negative so as to gradually cut that tube on. The transition point at which tube 16 is cut off and tube 14 cut on is very smooth and gradual, so that at the transition point both tubes are partially conducting and control of the power drive amplifier is in response to the combined signals from both the coarse channel and the fine channel, as well as to any stabilizing feedback signals added thereto.

For still larger servo errors, the coarse error signal becomes of sufficient magnitude that the control circuit 42 cuts the fine error tube 16 completely off and only the coarse error tube 14 then is conductive. The signal amplification arrangement employed in the coarse error channel permits the coarse error and stabilizing feedback signals to be directly combined without premature saturation of the discriminator transformers and consequent loss of effectiveness of the anticipation network 101.

As the coarse error signal drives the servo toward zero error, control of the system power drive is gradually transferred from the coarse error channel to the fine error channel, in a reverse manner to the transfer to coarse control just explained. Transition between the two error channels thus is very smoothly effected and the point at which transition occurs may be accurately controlled by proper adjustment of potentiometers 50 and 51 in the crossover network 42.

While the invention has been described in the foregoing with particular reference to vacuum tubes as the electric valve means for transferring control between the coarse and fine error channels, electric valve means of other known types such, for example, as saturable reactors, transistors and the like may instead be used if preferred. Only one preferred embodiment of the invention has been described and illustrated by way of example, but many modifications will occur to those skilled in the art and it therefore should be understood that the appended claims are intended to cover all such modifications as fall within the true spirit and scope of the invention.

What is claimed as new and which is desired to secure by Letters Patent of the United States is:

1. For use in a servo system including power drive means and two error signals indicative respectively of coarse and fine servo errors; and error signal transfer network comprising a pair of electric valves each including first and second control input means, means for applying said coarse error signal to said first control input means of one electric valve and applying said fine error signal to said first control input means of the other electric valve, means responsive to said coarse error signal for applying to said second control input means of each said electric valve a control signal such that decreasing values of said coarse error signal act to gradually cut off electric current flow through said one electric valve and permit increased current flow through said other electric valve, and means connecting both said electric valves to control said power drive means responsive to the error signals as respectively passed by said electric valves.

2. For use in a servo system including power drive means and separate coarse and fine error signals for controlling operation of said power drive means, an error signal transfer network comprising first and second electric valve means connected for conjoint control of energization of said power drive means, each said valve means including first and second control inputs, means for connecting said coarse error signal to one control input of said first valve means and connecting said fine error signal to the corresponding control input of said second valve means, means for applying to the other control input of said first valve means a first control signal of magnitude varying with magnitude of said coarse control signal, and means for applying to the other control input of said second valve means a second control signal of magnitude varying with magnitude of said coarse error signal oppositely with respect to said first control signal in a manner such that increasing magnitudes of said coarse error signal tend to gradually cut on said first valve means and to gradually cut off said second valve means to thus provide smooth transition of power drive control between said valve means.

3. For use in a servo system including power drive means and two alternating voltage error signals indicative respectively of coarse and fine servo errors; an error signal transfer network comprising coarse and fine error channels each including an electric valve having first and second control input means, means for connecting said coarse error signal to said first control input means of said coarse channel electric valve and connecting said fine error signal to said first control input means of the fine channel electric valve, means responsive to said coarse error signal for applying to said second control input means of each said electric valve a control signal such that increasing values of said coarse error signal act to gradually cut off electric current flow through said fine channel electric valve and permit increased current flow through said coarse channel electric valve, means in said coarse and fine error channels for discriminating the error signals as passed by said electric valves to produce unidirectional voltage signals of polarity and magnitude dependent respectively on the phase and magnitude of the corresponding error signal, and means for combining the unidirectional voltage output signals of said coarse and fine error channels for controlling energization of said power drive means responsive to the combined signal.

4. For use in a servo system including power drive means and two alternating voltage control signals indicative respectively of coarse and fine servo errors; an error signal transfer network comprising first and second electric valve means connected for conjoint control of energization of said power drive means, each said valve means including first and second control inputs, means for connecting said coarse error signal to one control input of said first valve means and connecting said fine error signal to the corresponding control input of said second valve means, means for biasing the other control input of each said electric valve toward cut off, means including a full wave rectifier network energized by said coarse error signal and operative to apply to said other control input of said first valve means a first unidirectional voltage control signal of magnitude varying directly with magnitude of the coarse control signal and of polarity to reduce the bias on said input with increasing magnitudes of the coarse error signal, said last named means further being operative to apply to said other control input of said second valve means a unidirectional voltage control signal of magnitude varying inversely with the magnitude of said coarse error signal so as to add to the input bias with increasing magnitudes of the coarse error signal, whereby increasing magnitudes of said coarse error signal tend to gradually cut on said first valve means and to gradually cut off said second valve means to thus provide smooth transition of power drive control between said valve means.

5. For use in a servo system including power drive means and two alternating voltage error signals indicative respectively of coarse and fine servo errors; an error signal transfer network comprising coarse and fine error channels each including an electric valve having first and second control input means, means for connecting said coarse error signal to said first control input means of said coarse channel electric valve and connecting said fine error signal to said first control input means of the fine channel electric valve, means responsive to said coarse error signal for applying to said second control input means of each said electric valve a control signal such that increasing values of said coarse error signal act to gradually cut off electric current flow through said fine channel electric valve and permit increased current flow through said coarse channel electric valve, a discriminator network including transformer means connected in each of said coarse and fine error channels for discriminating the error signals as passed by said electric valves to produce unidirectional voltage signals of polarity and magnitude dependent respectively on the phase and magnitude of the corresponding error signal, said coarse error channel further including lead filter means and direct current amplifier means connected therein, and means for combining the amplified unidirectional voltage output signal of said coarse error channel with the output signal of said fine error channel for controlling energization of said power drive means responsive to the combined signals.

6. For use in a servo system including power drive means and two alternating voltage error signals indicative respectively of coarse and fine servo errors and further including a stabilizing feedback signal; an error signal transfer network comprising coarse and fine error channels each including an electric valve having first and second control input means, means for connecting said coarse error signal to said first control input means of said coarse channel electric valve and connecting said fine error signal to said first control input means of the fine channel electric valve, means responsive to said coarse error signal for applying to said second control input means of each said electric valve a control signal such that increasing values of said coarse error signal act to gradually cut off electric current flow through said fine channel electric valve and permit increased current flow through said coarse channel electric valve, means in said coarse and fine error channels for discriminating the error signals as passed by said electric valves to produce unidirectional voltage signals of polarity and magnitude dependent respectively on the phase and magnitude of the corresponding error signal, and means for combining said stabilizing feedback signal with the unidirectional voltage output signals of said coarse and fine error channels for controlling energization of said power drive means responsive to the combined signal.

7. For use in a servo system including power drive means and two alternating voltage error signals indicative respectively of coarse and fine servo errors and further including a stabilizing feedback signal; and error signal transfer network comprising coarse and fine error channels each including an electric valve having first and second control input means, means for connecting said coarse error signal to said first control input means of said coarse channel electric valve and connecting said fine error signal to said first control input means of the fine channel electric valve, means responsive to said coarse error signal for applying to said second control input means of each said electric valve a control signal such that increasing values of said coarse error signal act to gradually cut off electric current flow through said fine channel electric valve and permit increased current flow through said coarse channel electric valve, a discriminator network including transformer means connected in each of said coarse and fine channels for discriminating the error signals as passed by said electric valves to produce unidirectional voltage signals of polarity and magnitude dependent respectively on the phase and magnitude of the corresponding error signal, said coarse error channel further including lead filter means and direct current amplifier means connected therein, and means for combining the amplified unidirectional voltage output signal of said coarse error channel directly with the output signal of said fine error channel and with said stabilizing feedback signal for controlling energization of said power drive means responsive to the error and stabilizing feedback signals thus combined.

References Cited in the file of this patent

UNITED STATES PATENTS

| 2,511,863 | McCoy | June 20, 1950 |
| 2,561,654 | Eller | July 24, 1951 |
| 2,614,237 | Goertz | Oct. 14, 1952 |
| 2,670,456 | Naylor et al. | Feb. 23, 1954 |
| 2,764,720 | Kelling | Sept. 25, 1956 |